United States Patent
Gupton et al.

(10) Patent No.: US 7,333,223 B2
(45) Date of Patent: *Feb. 19, 2008

(54) SYSTEM AND METHOD FOR ELECTRONICALLY DELIVERING DOCUMENTS

(75) Inventors: Junious Gupton, Richmond, VA (US); Todd Beck, Forest, VA (US); Varun Tandon, New Delhi (IN); Glen Young, Glen Allen, VA (US); Jeff Gainer, Richmond, VA (US); Scott Hamilton, Richmond, VA (US); Randy Harris, Midlothian, VA (US)

(73) Assignee: Genworth Financial, Inc., Richmond, VA (US)

( * ) Notice: Subject to any disclaimer, the term of this patent is extended or adjusted under 35 U.S.C. 154(b) by 840 days.

This patent is subject to a terminal disclaimer.

(21) Appl. No.: 10/003,411

(22) Filed: Dec. 6, 2001

(65) Prior Publication Data

US 2003/0107757 A1 Jun. 12, 2003

(51) Int. Cl.
*H04N 1/00* (2006.01)
*H04M 11/00* (2006.01)
*G06F 3/00* (2006.01)

(52) U.S. Cl. .............. 358/1.15; 358/401; 358/402; 358/403; 379/100.08; 379/93.24; 709/206; 709/219; 709/238; 709/239; 715/740; 715/748

(58) Field of Classification Search ........... 358/1.15, 358/402, 403, 401; 702/188; 714/48; 709/206, 709/207, 238, 239
See application file for complete search history.

(56) References Cited

U.S. PATENT DOCUMENTS

| | | | |
|---|---|---|---|
| 5,283,887 A | 2/1994 | Zachery | |
| 5,424,724 A | 6/1995 | Williams et al. | |
| 5,767,847 A | 6/1998 | Mori et al. | |
| 5,802,518 A | 9/1998 | Karaev et al. | |
| 5,813,007 A * | 9/1998 | Nielsen | 707/10 |
| 5,826,034 A * | 10/1998 | Albal | 709/239 |
| 5,894,558 A | 4/1999 | Falker | |
| 5,937,161 A * | 8/1999 | Mulligan et al. | 709/206 |
| 6,072,862 A * | 6/2000 | Srinivasan | 379/100.08 |
| 6,144,997 A | 11/2000 | Lamming et al. | |
| 6,278,988 B1 * | 8/2001 | Lau et al. | 707/1 |
| 6,343,327 B2 * | 1/2002 | Daniels et al. | 709/239 |
| 6,349,409 B1 | 2/2002 | Chan | |
| 6,385,655 B1 * | 5/2002 | Smith et al. | 709/232 |
| 6,427,164 B1 * | 7/2002 | Reilly | 709/206 |
| 6,647,385 B2 * | 11/2003 | Seestrom et al. | 707/7 |
| 6,701,315 B1 * | 3/2004 | Austin | 707/10 |
| 6,741,724 B1 * | 5/2004 | Bruce et al. | 382/101 |
| 6,782,415 B1 * | 8/2004 | Quine | 709/206 |

(Continued)

FOREIGN PATENT DOCUMENTS

WO 02/057867 7/2002

*Primary Examiner*—Aung S. Moe
*Assistant Examiner*—Beniyam Menberu
(74) *Attorney, Agent, or Firm*—Hunton & Williams LLP

(57) ABSTRACT

A system and method are provided for reliable and customer-friendly delivery of documents. One method of the present invention include the steps of: producing document data for printing documents; accepting requests to print selected documents; determining whether a selected document is accepted for electronic delivery or for non-electronic delivery; printing documents accepted for non-electronic delivery; and electronically delivering documents accepted for electronic delivery.

14 Claims, 4 Drawing Sheets

U.S. PATENT DOCUMENTS

| | | | |
|---|---|---|---|
| 6,957,248 B2* | 10/2005 | Quine et al. | 709/206 |
| 2001/0042047 A1* | 11/2001 | Nishida | 705/51 |
| 2001/0049745 A1* | 12/2001 | Schoeffler | 709/238 |
| 2003/0204421 A1 | 10/2003 | Houle et al. | 705/4 |
| 2004/0184101 A1* | 9/2004 | Hamilton et al. | 358/1.15 |
| 2005/0073665 A1* | 4/2005 | Taniguchi et al. | 355/53 |

\* cited by examiner

SYSTEM AND METHOD FOR ELECTRONICALLY DELIVERING DOCUMENTS

BACKGROUND OF THE INVENTION

The present invention generally relates to a system and method for electronically delivering documents. More specifically, the present invention relates to a system and method for electronically delivering documents designated for electronic delivery within a document generating system.

At present, almost every business of any size communicates with its customers almost exclusively through forms and documents which are printed and mailed. Typically, in this process documents are prepared using word processors which output the completed documents via a printer. Once out of the printer, the document is then inserted into an envelope and mailed. Overall, the present system for communicating with customers is both slow and very expensive involving high labor and postage costs for each piece of correspondence.

For these reasons, many companies have tried to encourage their customers to use the Internet to keep updated and to receive correspondence. However, the present systems available for companies are extremely limited in their scope and they require a great deal of customer participation to operate effectively. Additionally, many companies are reluctant to trust an electronic delivery system to transmit important documents. In many cases, such distrust is well founded as the present systems available for electronic document delivery are unreliable. In particular, many of the present document delivery systems are unreliable due to addressing errors for electronic mailboxes which are notoriously prone to user error.

Accordingly, what is needed is a comprehensive electronic delivery system and method which provides for the reliable and efficient delivery of documents.

SUMMARY OF THE INVENTION

According to the present invention, a system and method are provided for electronically delivering documents designated for electronic delivery within a document generating system.

According to one embodiment of the present invention, a system for electronically delivering documents is provided which includes a document system, the document system producing document information for printing documents; a print management system, wherein the print management system accepts document data and document print requests from the document system, and further wherein the print management system determines whether a requested document is designated for electronic delivery or non-electronic delivery; a recipient database, wherein the recipient database stores recipient information; a print system, wherein the print system is configured to receive and print documents designated for non-electronic delivery; and an email system, the email system configured to accept and process document data for creating and delivering documents electronically.

Additional objects and advantages of the present invention will be set forth in part in the description which follows, and in part will be obvious from the description, or may be learned by practice of the invention. The objects and advantages of the invention may be realized and attained by means of instrumentalities and combinations, particularly pointed out in the appended claims.

BRIEF DESCRIPTION OF THE DRAWINGS

The invention may take physical form in certain parts and arrangements of parts, an illustrative embodiment and method of which will be described in detail in this specification and illustrated in the accompanying drawings which form a part hereof, and wherein.

DETAILED DESCRIPTION OF THE INVENTION

Figure 1:
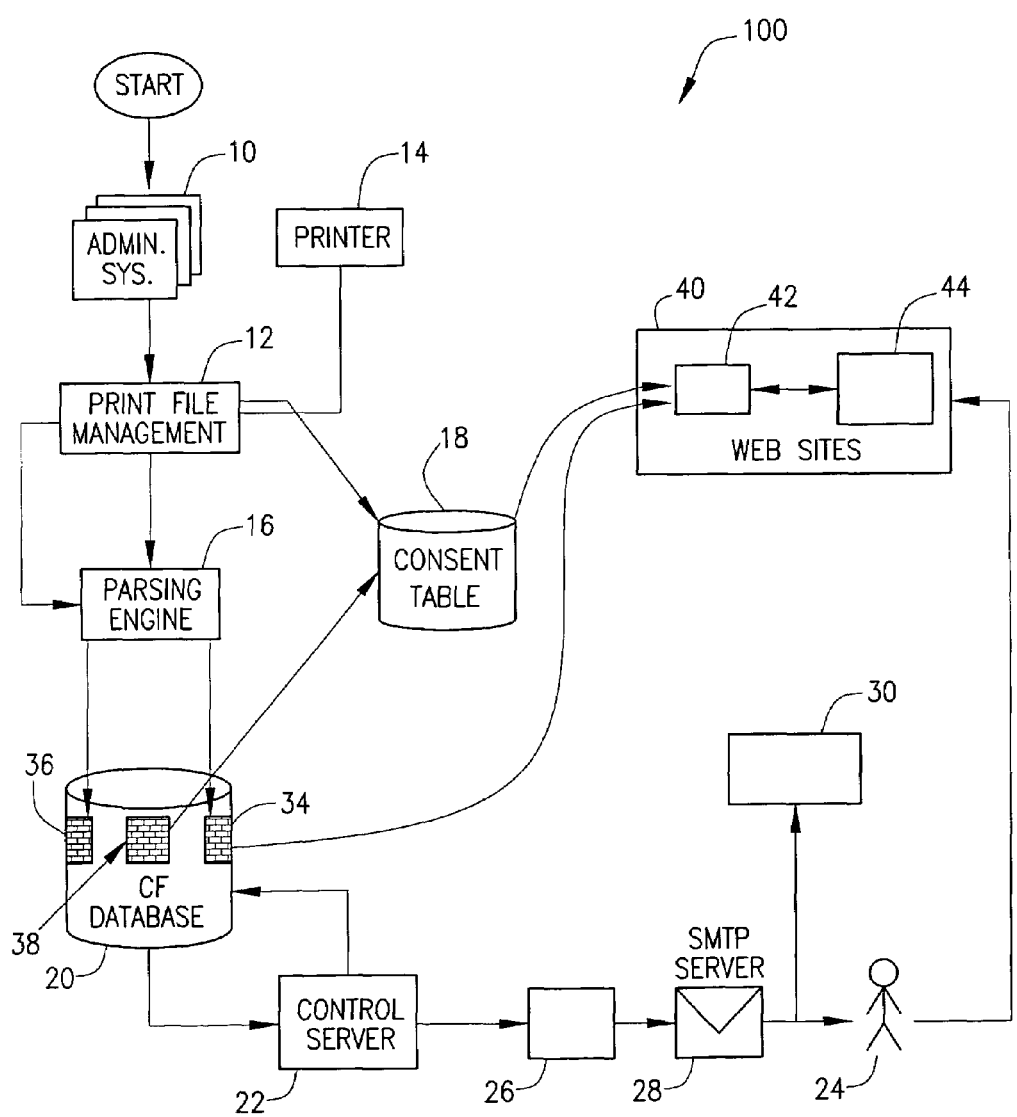
FIG. 1 is a simplified schematic representation illustrating one example of a computer network configuration for use with one embodiment of the present invention.

Reference will now be made in detail to the exemplary embodiments of the invention, an example of which is illustrated in the accompanying drawings in which like reference characters refer to corresponding elements. Preferably, the system and method of the present invention described below may be implemented by an interactive computer software application incorporated within a computer-readable medium such as a hard disk drive, an optical medium such as a compact disk, or the like. Further, the computer-readable medium may be available to a user either locally on the user's computer or remotely over a computer network, such as a local area network (LAN) or through the Internet.

The present invention provides users with a comprehensive solution for the electronic delivery of documents. Additionally, the present invention provides multiple means for monitoring the document delivery process and for correcting failed document delivery.

FIG. 1 illustrates an example network arrangement 100 employing a system and method of the present invention in accordance with an exemplary embodiment of the invention. It should be understood that the present invention operates independent of any particular arrangement or mix of network components and that the network 100 depicted in FIG. 1 is purely illustrative and simplified for the purpose of explanation.

As shown in FIG. 1, the exemplary network arrangement 100 is comprised of an administrative system 10. According to the preferred embodiment of the present invention, this administrative system 10 may be any computer or network of computers or computer systems which stores and/or produces documents. For the purposes of the present invention, the term "documents" is used to refer to any set of text communication whether in electronic or non-electronic form which may be printed out or viewed on a computer monitor. Further, the exemplary network arrangement 100 further comprises a print management server 12 for accepting document data and document print requests from the administrative system 10; and a parsing engine 16 for processing and storing document data on a central database server 20.

As further shown in FIG. 1, in accordance with an exemplary embodiment, the present invention may include a consent database 18 for storing the document delivery preferences for each customer. As discussed above, such document delivery preferences may include an option or a designation for each customer 24 to either receive documents electronically or non-electronically. Further in accordance with an exemplary embodiment, the present invention may also include a web server 40 for allowing customers 24 to access their customer data and electronic document data. According to an exemplary embodiment, such web access preferably includes access for all customers including both customers receiving documents electronically and non-electronically. In this way, customers who wish to keep and receive documents non-electronically may also have on-line access to their document data. As shown, the web server 40 may further include a customer authorization module 44 for controlling access to the web server 40 and a presentment module 42 for providing access to electronic documents and customer data. As further shown, the web server 40 may access selected data and electronic documents from a variety of sources including, for example, from the central database 20. Additionally, in accordance with a further exemplary embodiment, the present invention may include a failed email monitoring system 30 as described in detail below with reference to FIG. 3.

Figure 2:
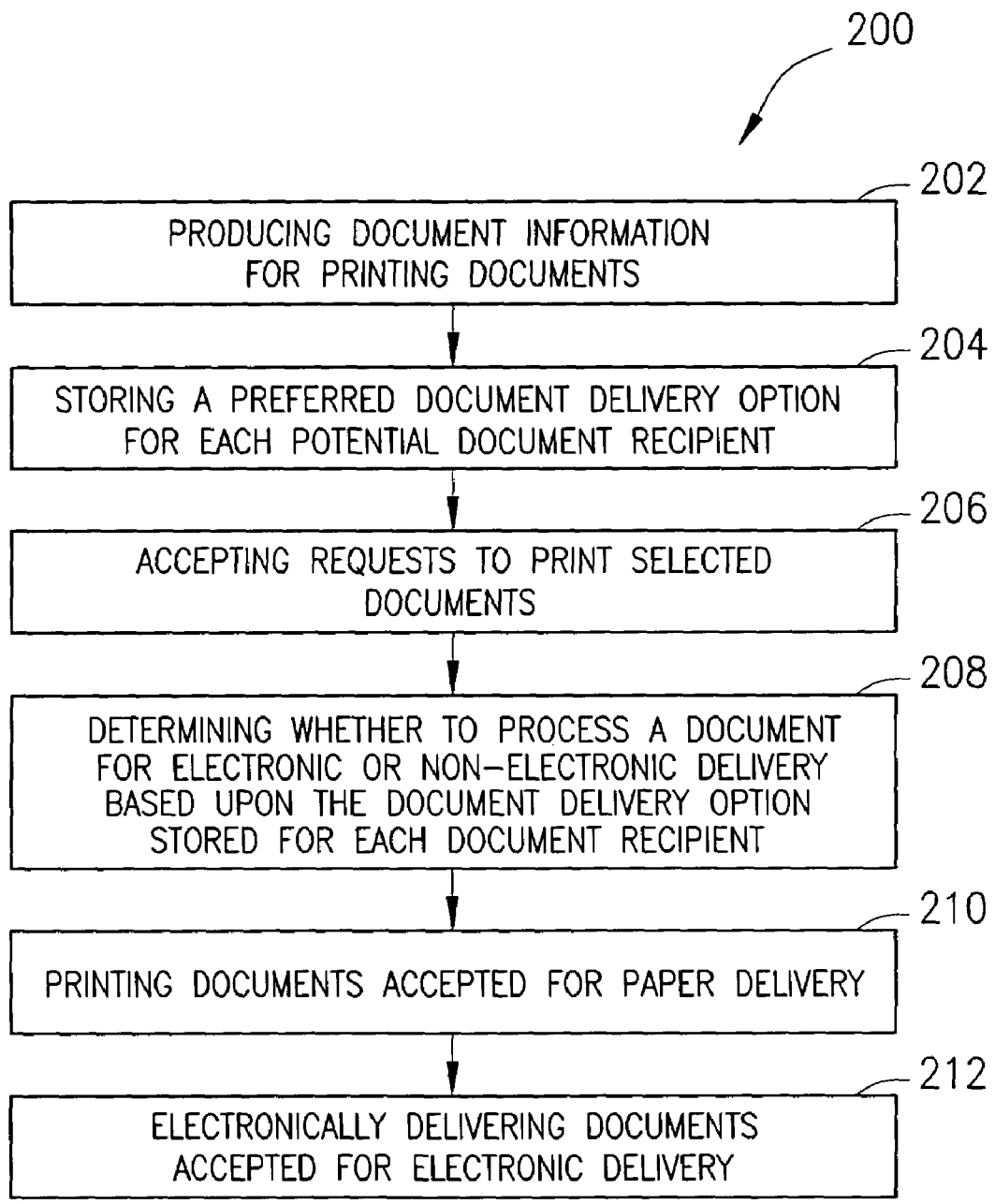
FIG. 2 is a simplified flowchart of a method for electronically delivering documents in accordance with one embodiment of the present invention.

FIG. 2 shows a block diagram illustrating steps in a method 200 for electronically delivering documents in accordance with an exemplary embodiment of the present invention. At step 202, users may produce documents within the administrative system 10 which are then stored and processed as electronic documents. At step 204, one or more document delivery options for each potential document recipient may be stored on a database or the like. In accordance with an exemplary embodiment of the present invention, the delivery options for each potential document recipient are preferably stored within the consent database 18 which is accessible throughout the network arrangement 100. Further in accordance with an exemplary embodiment of the present invention, the delivery option or designation for each potential document recipient is preferably set for either electronic document delivery or non-electronic document delivery. Preferably, each delivery option may be controlled by a network administrator or customer service representative using, for example, an intranet portal or the like. Alternatively, the delivery option may be configured to be set by individual customers via the web server 40 or by the failed email monitoring system 30 as described in detail below with reference to FIG. 3. In accordance with a preferred embodiment of the present invention, the delivery options for multiple document recipients belonging to specific groups or business units may be controlled and changed together by a selected manager or administrator. In this way, an organization can uniformly tailor their document delivery preferences and choices without having to change the delivery options for each employee or customer individually.

In step 206, a request to print selected documents is generated by the administrative system 10 and the request is forwarded to the print management server 12. In step 208, the print management server 12 determines whether to process the requested documents for electronic or non-electronic delivery based upon the document delivery option stored for each document recipient. In accordance with a preferred embodiment of the present invention, the print management server 12 determines the document delivery option for each selected document by accessing the document delivery option stored on the consent database 18.

In step 210, the print management server 12 forwards the documents selected for non-electronic delivery to a printer 14 for printing and mailing. In step 212, the print management server 12 forwards the documents selected for electronic delivery to an electronic delivery system. In accordance with an exemplary embodiment of the present invention, the electronic delivery system preferably includes a parsing engine 16 or similar device for processing and sorting document data for storage on the central database 20 which is then made available to control server 22 for composing electronic documents for email delivery to each customer 24 and to a web server 40 for on-line viewing. As discussed above, in accordance with an exemplary embodiment of the present invention, the electronic delivery system preferably composes electronic notices to customers which informs the customers of documents and document data updated to the web server 40 which are available for viewing.

Further in accordance with an alternative exemplary embodiment of the present invention, the control server 22 may also compose an electronic document containing document data and transmit the composed electronic document to the customer for viewing as, for instance, an email attachment or the like. As discussed above with respect to transmitting notices, each composed electronic copy of a stored electronic document may be forwarded to an email server 28 for transmission to the intended email recipient. Further, as discussed above, an additional server 26 may also be provided to combine or "bulk" electronic documents together prior to delivery so that customers may receive one email containing several copies of composed electronic documents.

Figure 3:
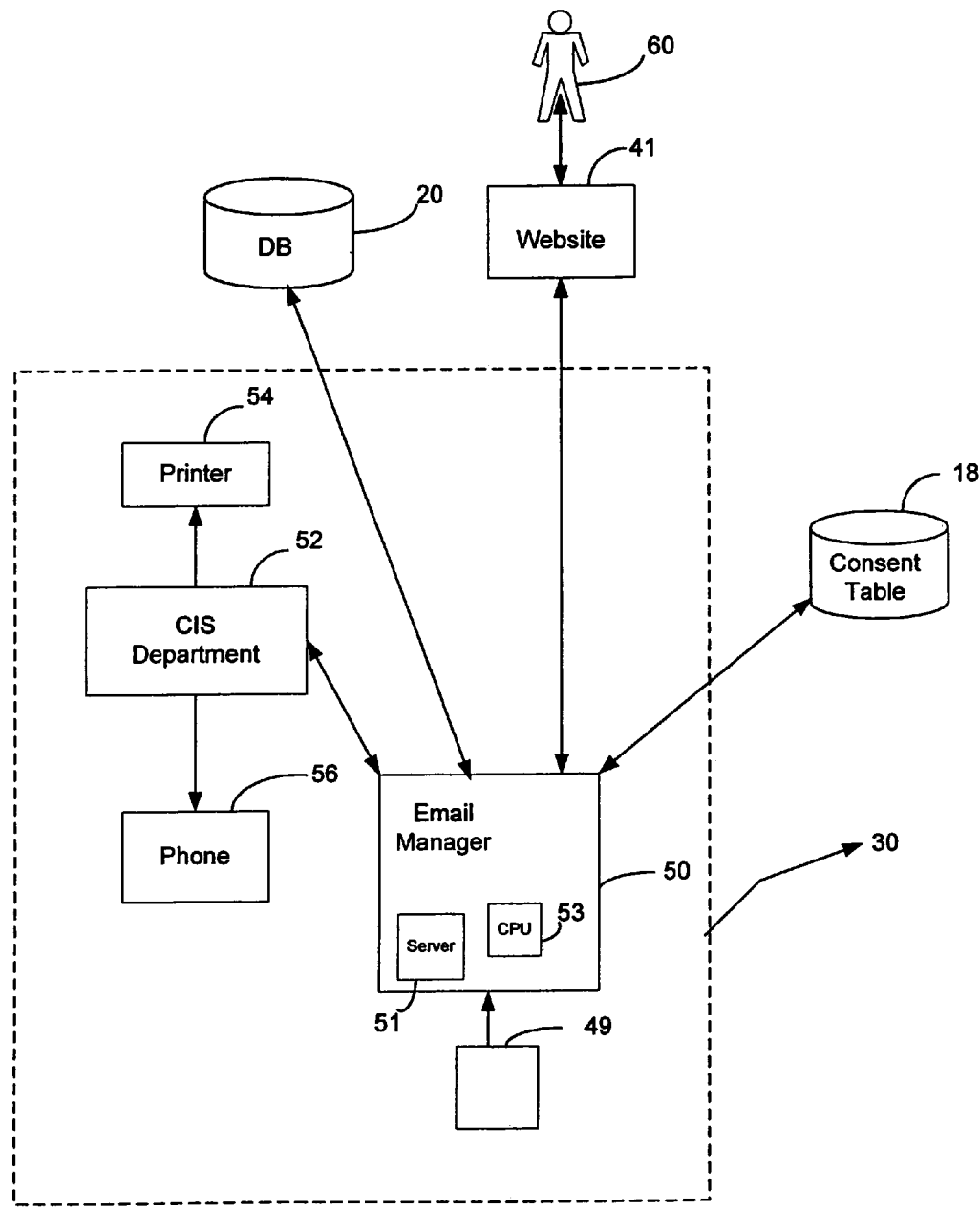
FIG. 3 is a simplified schematic representation illustrating another example of a computer network configuration for use with a second aspect of the present invention.

With reference now to FIG. 3, an example failed email monitoring system 30 in accordance with an exemplary preferred embodiment of the invention is illustrated. It should be understood, however, that the failed email monitoring system 30 operates independent of any particular arrangement or mix of network components and that the failed email monitoring system 30 depicted in FIG. 3 is purely illustrative and simplified for the purpose of explanation.

Figure 4:
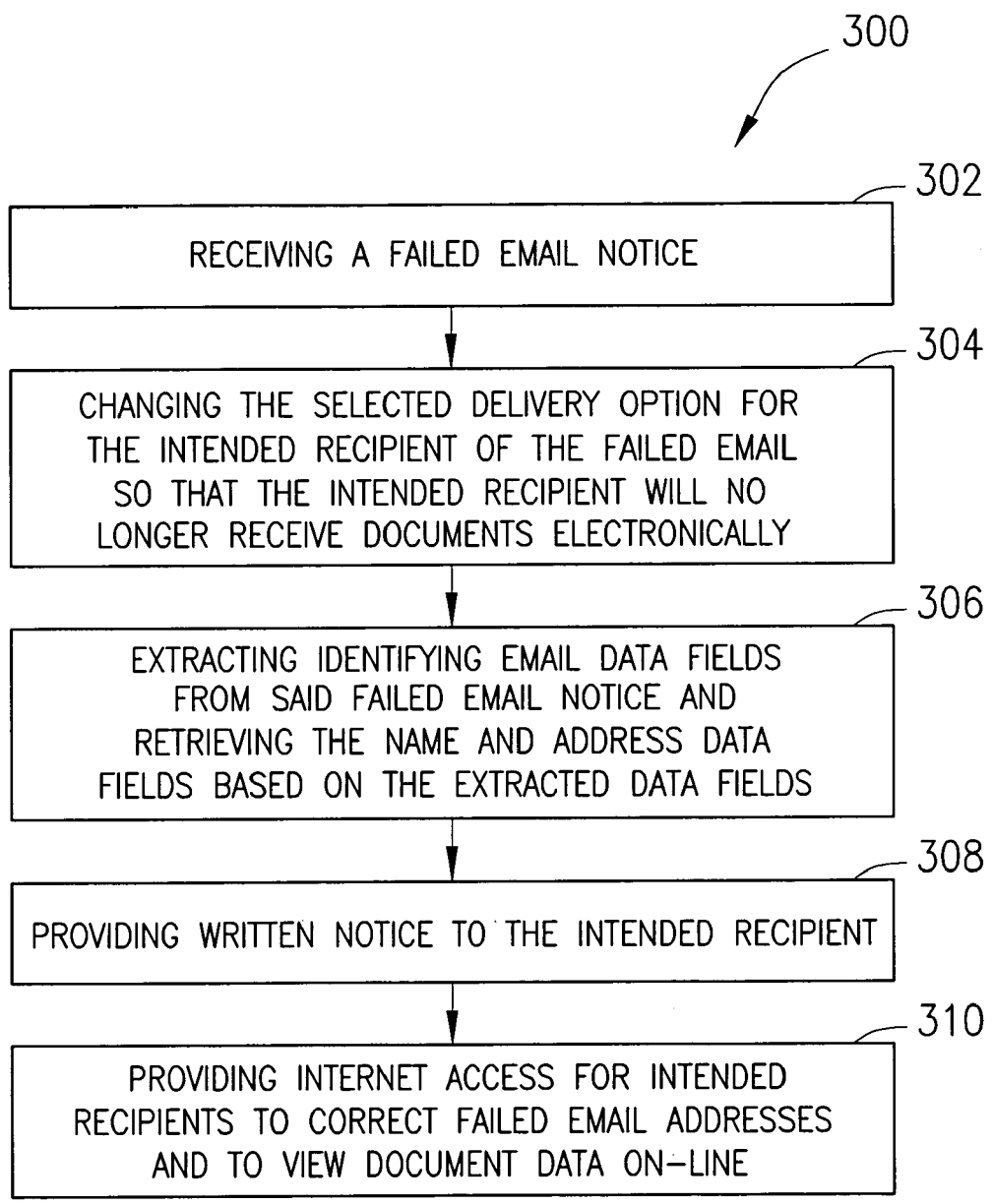
FIG. 4 is a simplified flowchart of a method for monitoring and correcting the failed electronic delivery of a document in accordance with one embodiment of the present invention.

FIG. 4 shows a block diagram 300 illustrating steps in a method of operation of the failed email monitoring system 30. In step 302, a failed email manager 50 receives a failed email notice 49. In step 304, in response to the failed email notice 49, the failed email manager 50 changes the document delivery option stored in the consent database 18 so that the intended recipient of the failed email receives only non-electronic documents. In accordance with an exemplary embodiment, the failed email manager 50 may be comprised of a server element 51 and a processing element 53.

In step 306, the failed email manager 50, preferably via processing element 53, extracts identifying email data fields from the failed email notice 49 and retrieves the corresponding customer 24's name and address data fields based on the extracted data fields. In accordance with an exemplary embodiment, the identify email data fields may include, for example, the failed email address and/or selected portions of the failed email address. Further in accordance with an exemplary embodiment, the failed email manager 50 may then accesses a database such as the central database 20 to look up and retrieve the appropriate name and address corresponding to the customer 24 associated with the extracted identify email data fields. The failed email manager 50 may then forward the failed email notice 49 to an appropriate department 52 which may contact the customer 24 directly via a telephone 56 if the contact information is available to do so.

In step 308, the failed email manager 50 may prompt the appropriate department 52 to print a written notice of the failed email attempt and send the written notice of the failed email attempt to the customer 24 via mail or facsimile. In accordance with an exemplary embodiment of the present invention, such written notice of the failed email attempt may include instructions 60 for the customer 24, in step 310, to access a web server 40 to correct the cause of the failed email and to view the document data contained in the failed email. Further in accordance with an exemplary preferred embodiment of the present invention, a postcard form may be provided within the website 41 to assist the customer 24 in correcting the cause of the failed email attempt. According to this feature of the present invention, the customer 24 may print the postcard form, provide the requested information on the postcard form and mail the postcard form back to the appropriate department 52 to update the customer 24's email information.

As is readily apparent from the above detailed description, the system and method of the present invention may be used in a variety of network configuration and is not intended to be limited to the example network configuration shown. For instance, though the example configuration of the present invention uses multiple databases and servers to store and access information, the present invention may also be configured so that only a single database and server are used. Alternatively, the databases of the present invention may also be broken up into several more discrete databases which may be distributed or duplicated on several servers.

Additionally, the present invention may be used within network arrangements such as local area networks (LAN), including Ethernet and Token Ring access methods, wireless local area networks (WLAN), metropolitan area networks (MAN), virtual local area networks (VLAN), wide area networks (WAN), and Bluetooth networks. Additionally, the present invention may work within wireless data networks such as GPRS, NTT DoCoMo, Hot Spots, GSM-Data, CDMA-One and HS-CDS networks, and wired public networks such as POTS, DSL, Cable and ISDN networks.

Further, although the exemplary embodiments are discussed without reference to a particular operating environment, the present invention may be used in a variety of server platforms and operating environments such as, for example, Windows NT, Me, XP, 95, 98 and 2000 operating systems, as well as the Unix operating system, the OS/2 operating system, the Pocket PC operating systems and the NetWare operating system.

Additionally, the present invention may be used with a variety of networking links and protocols including those based upon, for example, a Network File System (NFS); a Web NFS; a Server Message Block (SMB); a Samba; a Netware Core Protocol (NCP); a Distributed File System (DFS), and a Common Internet File System (CIFS) architecture, and may use such transport protocols as, for example, TCP/IP, IPX/SPX, HTTP, HTTPS and NetBEUI.

The invention has been described with particular reference to embodiments which are intended to be illustrative rather than restrictive. Alternative embodiments will be apparent to those skilled in the art to which this invention pertains without departing from its spirit and scope. Thus, such variations and modifications of the present invention can be effected within the spirit and scope of the following claims.

What is claimed is:

1. A system for electronically delivering documents, said system comprising:
    a document system, said document system producing document information for printing documents;
    a print management system, wherein said print management system accepts document data and document print requests from said document system, and further wherein said print management system determines whether a requested document is designated for electronic delivery or non-electronic delivery;
    a recipient database, wherein said recipient database stores recipient information;
    a print system, wherein said print system is configured to receive and print documents designated for non-electronic delivery, wherein said print management system determines whether to process a document for electronic or non-electronic delivery based upon a document delivery designation stored in a consent database;
    an email system, said email system configured to accept and process document data for creating and delivering documents electronically, wherein said email system composes and transmits electronic notices regarding the status and availability of stored documents and document data, and wherein said email system combines multiple electronic notices for delivery to a single recipient at one time;
    a failed email management system, wherein said failed email management system is configured and arranged to receive a notice of a failed email delivery including a failed email address, and to change a document delivery designation for an intended recipient of a failed email so that the intended recipient will no longer receive electronic documents;
    said consent database storing each potential document recipient's selected document delivery designation to receive documents electronically or non-electronically;
    a parsing engine, wherein said parsing engine receives document data from said print management system for documents selected for electronic delivery, and further wherein said parsing engine processes said document data for storage; and
    a server, wherein said server provides on-line access to the document data and electronic documents stored by said parsing engine.

2. A system for electronically delivering documents, said system comprising:
    a document system, said document system producing document information for printing documents;
    a print management system, wherein said print management system accepts document data and document print requests from said document system, and further wherein said print management system determines whether a requested document is designated for electronic delivery or non-electronic delivery;
    a recipient database, wherein said recipient database stores recipient information;
    a print system, wherein said print system is configured to receive and print documents designated for non-electronic delivery, wherein said print management system determines whether to process a document for electronic or non-electronic delivery based upon a document delivery designation stored in a consent database;
    an email system, said email system configured to accept and process document data for creating and delivering documents electronically, wherein said email system composes electronic documents comprised of document data and transmits said electronic documents to electronic document recipients, and wherein said email system combines multiple electronic documents for delivery to a single recipient at one time;

a failed email management system, wherein said failed email management system is configured and arranged to receive a notice of a failed email delivery including a failed email address, and to change a document delivery designation for an intended recipient of a failed email so that the intended recipient will no longer receive electronic documents;

said consent database storing each potential document recipient's selected document delivery designation to receive documents electronically or non-electronically;

a parsing engine, wherein said parsing engine receives document data from said print management system for documents selected for electronic delivery, and further wherein said parsing engine processes said document data for storage; and a server, wherein said server provides on-line access to the document data and electronic documents stored by said parsing engine.

3. The system of claim 2, wherein the document delivery designations for multiple recipients are changed together based upon common identifying criteria.

4. A system for electronically delivering documents, said system comprising:

a document system, said document system producing document information for printing documents;

a print management system, wherein said print management system accepts document data and document print requests from said document system, and further wherein said print management system determines whether a requested document is designated for electronic delivery or non-electronic delivery;

a recipient database, wherein said recipient database stores recipient information;

a print system, wherein said print system is configured to receive and print documents designated for non-electronic delivery;

an email system, said email system configured to accept and process document data for creating and delivering documents electronically;

a failed email management system, wherein said failed email management system is configured and arranged to receive a notice of a failed email delivery including a failed email address, and to change a document delivery designation for an intended recipient of a failed email so that the intended recipient will no longer receive electronic documents, wherein: (1) said failed email management system extracts identifying email data fields from said notice of a failed email delivery and retrieves a name data field and an address data field from the recipient database based on the extracted identify email data fields, (2) said failed email management system further comprises an Internet server, wherein said Internet server provides access for the intended recipient to correct said failed email addresses, and (3) said failed email management system further comprises a postcard form template accessible via the Internet, wherein the intended recipient may print the postcard form template, provide information requested on the postcard form template and mail the postcard form template back for processing.

5. A method for electronically delivering documents, said method comprising the steps of:

producing document data for printing documents;
accepting requests to print selected documents;
determining whether a selected document is accepted for electronic delivery or for non-electronic delivery;
printing documents accepted for non-electronic delivery;
electronically delivering documents accepted for electronic delivery;
changing a corresponding document delivery designation if a failed email notification is received so that an intended recipient will no longer receive electronic documents;
storing one or more preferred document delivery options for each potential document recipient, wherein said preferred document delivery options include an option to receive documents electronically and an option to receive documents non-electronically;
determining whether to process a document for electronic delivery or for non-electronic delivery based upon the preferred document delivery option stored for each document recipient;
receiving document data for one or more documents selected for electronic delivery, and processing said document data for remote access and electronic document delivery;
composing electronic documents from said document data; and
combining multiple electronic documents for delivery to a single recipient at one time.

6. A method for electronically delivering documents, said method comprising the steps of:

producing document data for printing documents;
accepting requests to print selected documents;
determining whether a selected document is accepted for electronic delivery or for non-electronic delivery;
printing documents accepted for non-electronic delivery;
electronically delivering documents accepted for electronic delivery;
changing a corresponding document delivery designation if a failed email notification is received so that an intended recipient will no longer receive electronic documents, wherein the document delivery designations for multiple recipients are changed together based upon common identifying criteria;
storing one or more preferred document delivery options for each potential document recipient, wherein said preferred document delivery options include an option to receive documents electronically and an option to receive documents non-electronically;
determining whether to process a document for electronic delivery or for non-electronic delivery based upon the preferred document delivery option stored for each document recipient; and
receiving document data for one or more documents selected for electronic delivery, and processing said document data for remote access and electronic document delivery.

7. A method for electronically delivering documents, said method comprising the steps of:

producing document data for printing documents;
accepting requests to print selected documents;
determining whether a selected document is accepted for electronic delivery or for non-electronic delivery;
printing documents accepted for non-electronic delivery;
electronically delivering documents accepted for electronic delivery; and
changing a corresponding document delivery designation if a failed email notification is received so that an intended recipient will no longer receive electronic documents;
providing a non-electronic notice of a failed email delivery to the intended recipient of the failed email;

extracting one or more identifying email data fields from said non-electronic notice of a failed email delivery and retrieving a name data field and an address data field from the recipient database based on the extracted one or more identifying email data fields;

providing Internet access for intended recipients to correct failed email addresses and to view document data; and providing a postcard form template accessible via the Internet, wherein the intended recipients may each print the postcard form template, provide information requested on the postcard form template and mail the postcard back to the appropriate department.

8. A method for electronically delivering documents, said method comprising the steps of:

producing document data for printing documents;
accepting requests to print selected documents;
determining whether a selected document is accepted for electronic delivery or for non-electronic delivery;
printing documents accepted for non-electronic delivery;
storing documents and document data for documents accepted for electronic delivery;
providing Internet access to the documents and document data accepted for electronic delivery;
providing notice regarding the status and availability of said stored documents and document data to intended document recipients;
changing a preferred delivery option for the intended recipient of a failed email so that the intended recipient will no longer receive electronic documents, wherein said preferred document delivery options include an option to receive documents electronically and an option to receive documents non-electronically; and
combining multiple electronic notices for delivery to a single recipient at one time.

9. A method for electronically delivering documents, said method comprising the steps of:

producing document data for printing documents;
accepting requests to print selected documents;
determining whether a selected document is accepted for electronic delivery or for non-electronic delivery;
printing documents accepted for non-electronic delivery;
storing documents and document data for documents accepted for electronic delivery;
providing Internet access to the documents and document data accepted for electronic delivery;
providing notice regarding the status and availability of said stored documents and document data to intended document recipients;
changing a preferred delivery option for the intended recipient of a failed email so that the intended recipient will no longer receive electronic documents, wherein the document delivery designations for multiple recipients are changed together based upon common identifying criteria; and storing one or more preferred document delivery options for each potential document recipient.

10. A method for electronically delivering documents, said method comprising the steps of:

producing document data for printing documents;
accepting requests to print selected documents;
determining whether a selected document is accepted for electronic delivery or for non-electronic delivery;
printing documents accepted for non-electronic delivery;
storing documents and document data for documents accepted for electronic delivery;
providing Internet access to the documents and document data accepted for electronic delivery;
providing notice regarding the status and availability of said stored documents and document data to intended document recipients;
changing a preferred delivery option for the intended recipient of a failed email so that the intended recipient will no longer receive electronic documents;
providing a non-electronic notice of a failed email delivery to the intended recipient of the failed email;
extracting one or more identifying email data fields from said non-electronic notice of a failed email delivery and retrieving a name data field and an address data field from the recipient database based on the extracted one or more identifying email data fields,
providing Internet access for intended recipients to correct failed email addresses and to view document data; and
providing a postcard form template accessible via the Internet, wherein the intended recipients may each print the postcard form template, provide information requested on the postcard form template and mail the postcard back to the appropriate department.

11. The system of claim 1 wherein changing a document delivery designation comprises changing a stored document delivery designation so that future documents are delivered to the intended recipient only non-electronically.

12. The method of claim 5 wherein changing a corresponding document delivery designation comprises changing a stored corresponding document delivery designation so that future documents are delivered to the intended recipient only non-electronically.

13. The system of claim 1 wherein changing a preferred delivery option comprises changing a stored preferred delivery option so that future documents are delivered to the intended recipient only non-electronically.

14. The method of claim 8, wherein said method further comprises the step of determining whether to process a document for electronic delivery or for non-electronic delivery based upon the preferred document delivery option stored for each document recipient.

* * * * *